June 18, 1940.　　　　J. HALTENBERGER　　　　2,204,990
AUTOMOBILE HOOD
Filed July 20, 1939
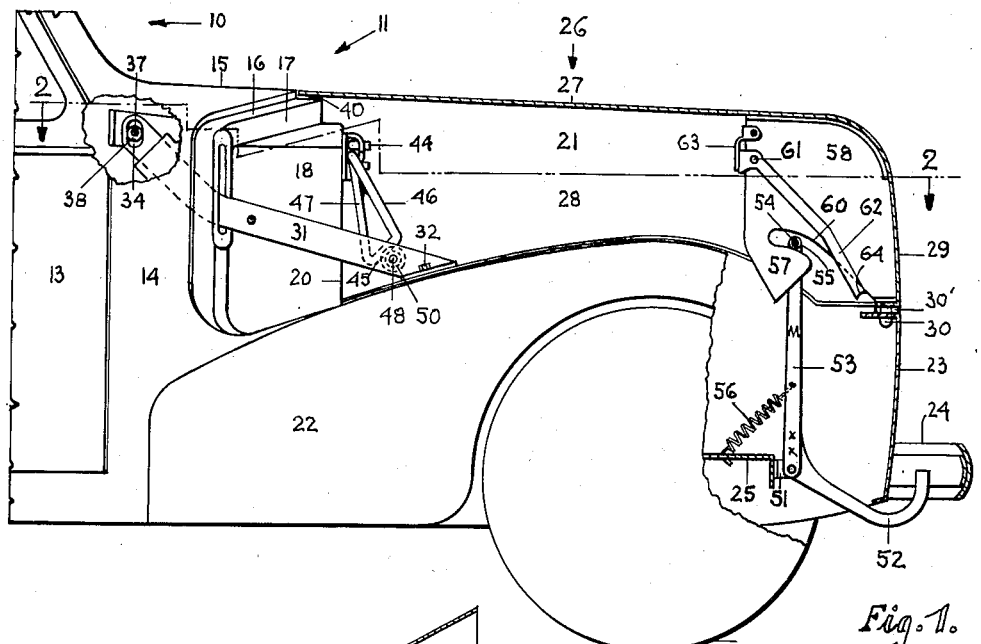
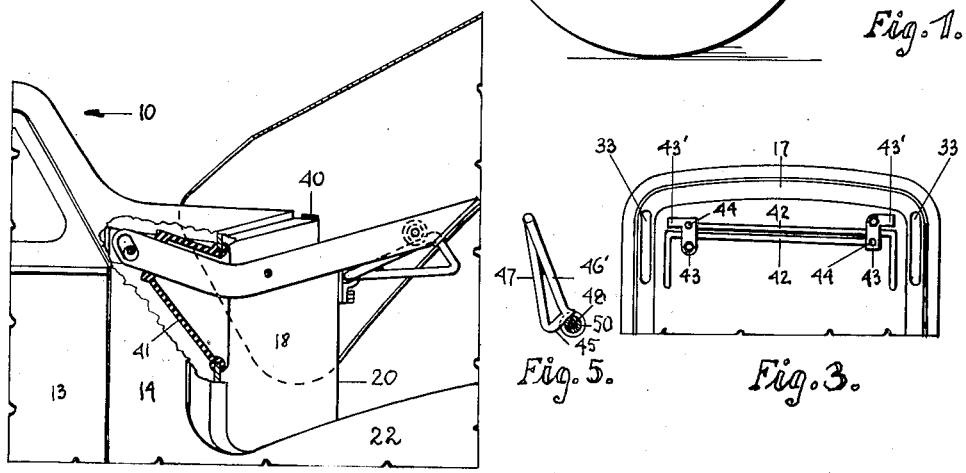
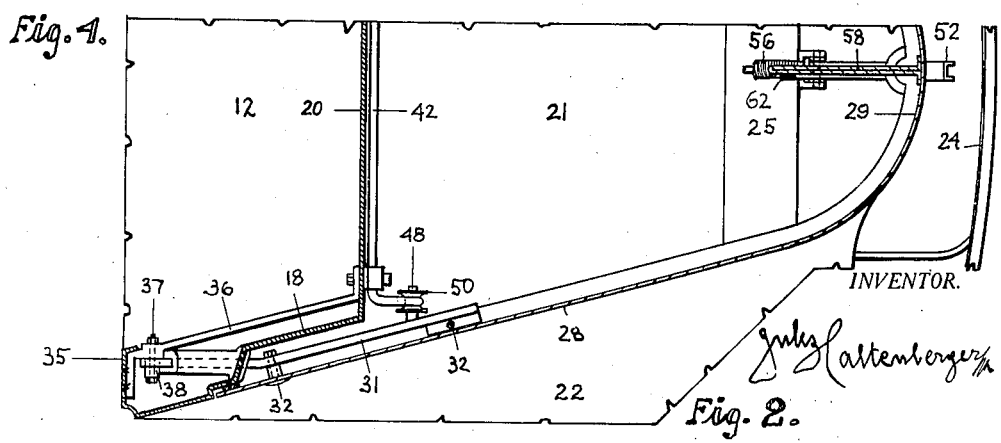
INVENTOR.
Jules Haltenberger Patented June 18, 1940

2,204,990

UNITED STATES PATENT OFFICE 2,204,990

AUTOMOBILE HOOD

Jules Haltenberger, Ann Arbor, Mich.

Application July 20, 1939, Serial No. 285,539

3 Claims. (Cl. 180—69)

The present application is a modification of my copending application for "Automobile hood" Serial No. 204,717 filed April 28, 1938, now Patent 2,188,891.

Alligator hood constructions now in use are usually provided with a pair of differential hinges in association with coil spring positioners, requiring 8 hinge fulcrum points. These hinge points require accurate and exact co-relations and as groups they have to be aligned and adjusted for each automobile to compensate for the variations in the production error of each car. Hood aligning and adjusting is a skilled art; consequently, it is expensive, and the frequent introduction of new variations delays production, and makes servicing difficult.

It is here proposed to provide an alligator hood with but two hinge points, arranged for an automatic vertical adjustment of the hood, and to provide, from an accessible place, for the longitudinal adjustment.

A further object is to provide a torsion spring wholly supported by the stationary cowl, arranged to press the hood downwardly in its whole length when the hood is in closed position and also to hold the hood in open position.

A further object is to provide an automatic self-tightening hood lock, eliminating the usual manually operated lock that is often forgotten, and also eliminating the necessity for various safety catch devices to prevent the damage caused by forgetfulness.

A further object is to provide the hood lock with a foot pedal controlled release, that upon release automatically lifts the hood.

Further and more particularly expressed objects of the invention will appear as the description proceeds.

My invention may be embodied in the forms illustrated: Here Fig. 1 is a side elevation of the front of an automobile with a closed hood and with parts in section; Fig. 2 is a section substantially on line 2—2 of Fig. 1; Fig. 3 is a front view of the dash board here shown in a smaller scale; Fig. 4 is a side elevation showing the hood in open position; Fig. 5 is a modification of a cam.

Referring to Figs. 1 to 4 inclusive it will be seen that an automobile body indicated generally at 10 is formed forwardly into a cowl at 11. The body interior has a front compartment 12 and the exterior has front doors 13 and exposed door pillars 14.

The cowl is formed of ventilator shelf 15, hood ledge 16, hood ledge wall 17, cowl side walls 18 and dash board 20. In front of the dash board is the usual engine chamber 21.

The body with its usual associated parts supports front fenders 22, usual adjustable radiator grille wall 23, front bumper 24, and a front cross member 25.

A hood indicated generally at 26 is formed of a substantially horizontal wall 27, side walls 28, and nose 29 having a usual pilot pin 30 seated in adjustable grille wall 23. Between the hood nose and grille wall a rubber spacer 30' is provided. The hood is provided with a pair of laterally spaced single hinge legs 31 (only one shown) secured to hood side walls 28 as by bolts 32. Leg 31 passes through a vertical opening 33 in hood ledge wall 17, and here it is bent upwardly terminating in an eyelet having a normally vertical elongated slot 34.

Door pillars 14 are formed into rear walls 35. Walls 35 and the dash board 20 are connected by the usual cowl braces 36 (only one is shown) having a hood longitudinal adjustment locking bolt 37. This bolt passes through a turnable eccentric sleeve 38; the sleeve is placed in slot 34 in the end portion of hinge leg 31.

It is important to note that normally the eccentric sleeve 38 is in the mid-portion of slot 34; hence, it doesn't interfere with the seating of the hood, which is constantly seated on lining 40 on hood ledge 16.

To prevent engine noise and smell reaching the body an inexpensive rubber boot 41 is provided. For certain applications, however, I might provide a metallic pocket (not shown).

The above described construction permits a quick and simple hood mounting, as only the hinge legs need to be passed through the hood ledge wall openings. After the insertion and adjustment of the eccentric sleeves they are locked in place, an operation performed from the inside of the body. After this operation the adjustable radiator grille wall is secured in place.

To press the hood constantly downward when in closed position and to hold it in open position a pair of torsion rod springs 42 are provided. Brackets 43 support these springs on dash board 20, and are provided with torsion limiting edges 43'. The bent end 44 of the spring 42 passes through an opening in bracket 43, thereby forming a spring anchor. The opposite bracket forms the operative guide, the spring terminates in a triangular-shaped cam having a pressing face 45, lifting face 46 and an end-welded brace 47. Hinge leg 31 is provided with a stud 48, carrying a concave roller 50 for the reception of the cam.

As is clear from Fig. 1 when the hood is closed, face 45 rides on roller 50. The angular position of this face in relation to the hood hinge point creates a downward component. This will press the hood downward in its entire length as the roller is intermediate the ends of the longitudinal hood supporting surfaces. When the hood front end is lifted, roller 50 approaches and then passes the junction point of faces 45 and 46, and the springs will assist the lifting of the hood. When face 46 is under the roller, the torsional forces in springs 42 will hold the hood in open position as shown in Fig. 4. In this position the hinge end of face 46 is resting against the torsion limiting edge 43'.

Front cross-member 25 is provided with a hinge bracket 51, carrying a sheet metal foot pedal 52 to which is welded normally vertical arms 53. The tops of these arms are interconnected by a bolt 54, carrying roller 55. Arms 53 at their mid-section are provided with a tension spring 56, anchored in cross-member 25. The upper part of arms 53 straddle a sheet metal eccentric hood holding cam 57, a part of plate 58, secured to the hood nose in any desired manner. Above the cam and forwardly thereof the sheet metal is formed into a force lift cam 60. At the upper end of plate 58 a fulcrum bolt 61 supports a lift rod 62. It is normally held in the position illustrated in Fig. 1 by flat spring 63.

It will be noted that the bottom end of rod 62 overlaps cam 60 and has a concave end portion 64. In operation, when foot pedal 52 is depressed, roller 55 releases hood holding cam 57, and thereafter by cam 60 forcibly lifts the hood front end to the first stage. At the travel limit of the arms 53 roller 55 reaches to an aligned position of concave end portion 64. Upon release of the foot pedal tension spring 56 will return arms 53 to a vertical position. This return by the engagement of roller 55 and concave end portion 64 will utilize lift rod 62 as a toggle joint hood lifter, lifting the hood to the second stage. Before the second stage ends concave roller 50 passes to the lifting face 46 of the triangle cam of torsion spring 42 which cam completes the operation. Here rod 62 is also freed and by spring 63 is returned to the relative position illustrated in Fig. 1.

For closing, the hood is simply pressed downward, pressing faces 45 hold it, and roller 55 on cam 57 locks it in a self-tightening position.

For certain applications I eliminate the mechanical second stage lifting and dispense with parts 61, 62 and 63 by forming a different triangle cam illustrated in Fig. 5. Here lifting face 46' is concave and the joining point of faces 45 and 46' is near the center of roller 50. It is so arranged that when depressing pedal 52 roller 50 passes from face 45 to 46 when the hood might be assisted to reach the open position if a weak torsion spring is used.

Hood hinge constructions, where a spring does a double operation, is not new with the applicant. Here, however, the springs are independently secured to the dash board as a subassembly and the usual six point linkage or three point linkage and bridge operating the coil springs is eliminated. The elimination of differential hinges makes easy operation of a complete hood opening by a light pressure on a foot pedal when so desired. Whereas the end of the foot pedal here is illustrated as being centrally located between the radiator grille and front bumper, for certain applications I might place it below the front bumper or offset it from the center (not shown).

The applicant has here illustrated an alligator hood having large depending side walls. This invention is applicable to any form of alligator hood; for example, where the hood side walls are stationary.

What applicant claims as his invention:

1. In an automobile, a body, an alligator hood, single hinge means connecting said hood to said body, torsion rod spring means mounted on said body and having hood depressing and hood lifting positions, a pedal operated releasable hood lock on said automobile, and means on said lock whereby upon release of the same said hood is shifted from said hood depressing position to said hood lifting position.

2. In an automobile, a body, an alligator hood, hinge means connecting said hood to said body, torsion rod spring means between said body and hood, and means on said torsion rod spring means depressing said hood when in closed position and holding said hood open when in open position.

3. In an automobile, a body, an alligator hood and a supporting structure therefor, hinge means connecting said hood to said body, hood lifting spring means between said hood and body, a self-tightening spring controlled releasable lock between said hood and said supporting structure, and means associated with said lock forcibly separating said hood from said supporting structure upon release operation of said lock and placing said hood over said lifting spring means.

JULES HALTENBERGER.